United States Patent
Inanc et al.

(10) Patent No.: US 12,449,559 B2
(45) Date of Patent: Oct. 21, 2025

(54) SYSTEM AND METHOD FOR A CEMENT AND CASING FLAW DETECTOR WITH MULTI-SIZED

(71) Applicant: Baker Hughes Oilfield Operations LLC, Houston, TX (US)

(72) Inventors: Feyzi Inanc, Houston, TX (US); Peng Yuan, Houston, TX (US); Sushant Dutta, Sugar Land, TX (US); Toyli Anniyev, Houston, TX (US); Andre' Porter, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 201 days.

(21) Appl. No.: 18/234,757

(22) Filed: Aug. 16, 2023

(65) Prior Publication Data
US 2025/0060508 A1    Feb. 20, 2025

(51) Int. Cl.
*G01V 5/12* (2006.01)
*E21B 47/002* (2012.01)
*E21B 47/005* (2012.01)

(52) U.S. Cl.
CPC ............ *G01V 5/125* (2013.01); *E21B 47/002* (2020.05); *E21B 47/005* (2020.05)

(58) Field of Classification Search
CPC ...... G01B 5/125; E21B 47/002; E21B 47/005
See application file for complete search history.

(56) References Cited

U.S. PATENT DOCUMENTS

| | | | | |
|---|---|---|---|---|
| 3,110,807 A | * | 11/1963 | Wilson | G01V 5/12 250/269.3 |
| 4,180,727 A | * | 12/1979 | Givens | G01V 5/125 250/269.3 |
| 4,297,575 A | * | 10/1981 | Smith, Jr. | E21B 47/085 250/269.3 |
| 4,578,580 A | * | 3/1986 | Smith, Jr. | G01V 5/12 250/269.3 |
| 4,705,944 A | * | 11/1987 | Coope | G01V 5/12 250/269.3 |

(Continued)

OTHER PUBLICATIONS

Jing Yang, "Design of Tubular Azimuth Gamma Ray Logging Tool," Oct. 20, 2016, World Journal of Engineering and Technology, 6 pages.

(Continued)

*Primary Examiner* — Blake C Riddick
(74) *Attorney, Agent, or Firm* — Hogan Lovells US LLP (57) ABSTRACT

A detector to determine flaws in cement and casing associated with a formation using a visual representation of gamma rays received simultaneously through at least two windows that are of different sizes and that are diametrically opposite to each other in a rotating shield including a single scintillating crystal, where the visual representation is to indicate the flaws and includes a background with at least part of a contrast that is suppressed based in part on a gamma contrast range obtained from at least first gamma counts from gamma rays received at a first degree of alignment of the two windows with respect to an azimuth that is associated with the formation and second gamma counts from the gamma rays received at a second degree of alignment of the two windows that is offset from the first degree of alignment.

20 Claims, 7 Drawing Sheets

(56) References Cited

U.S. PATENT DOCUMENTS

| | | | |
|---|---|---|---|
| 7,195,062 B2 | 3/2007 | Cairns | |
| 7,294,829 B2* | 11/2007 | Gilchrist | G01V 5/101 250/266 |
| 8,975,574 B2 | 3/2015 | Huiszoon | |
| 9,057,795 B2 | 6/2015 | Guo | |
| 9,897,718 B2 | 2/2018 | Mauborgne | |
| 10,208,587 B1* | 2/2019 | Kasten | G01V 5/12 |
| 10,895,661 B2 | 1/2021 | Guo | |
| 10,941,653 B2 | 3/2021 | Hu | |
| 11,500,121 B1 | 11/2022 | Kuespert | |
| 2007/0242265 A1* | 10/2007 | Vessereau | E21B 47/002 385/116 |
| 2010/0017134 A1* | 1/2010 | Steinman | G01V 5/125 250/363.01 |
| 2011/0272569 A1* | 11/2011 | Sinclair | G01V 5/06 250/394 |
| 2011/0284732 A1* | 11/2011 | Korkin | E21B 47/005 250/269.1 |
| 2012/0119077 A1* | 5/2012 | Smaardyk | E21B 47/00 250/269.1 |
| 2013/0009049 A1* | 1/2013 | Smaardyk | G01V 5/125 250/269.1 |
| 2013/0043381 A1* | 2/2013 | Smaardyk | E21B 43/26 250/269.1 |
| 2013/0261974 A1* | 10/2013 | Stewart | G01V 5/125 250/269.3 |
| 2014/0291024 A1 | 10/2014 | Sugiura et al. | |
| 2014/0291500 A1* | 10/2014 | Smaardyk | G01V 5/125 250/269.1 |
| 2014/0374582 A1 | 12/2014 | Guo et al. | |
| 2016/0123137 A1* | 5/2016 | Liu | E21B 7/06 250/254 |
| 2016/0170079 A1* | 6/2016 | Zhou | G01V 5/102 250/269.8 |
| 2016/0187528 A1* | 6/2016 | Sofiienko | G01N 23/203 250/269.1 |
| 2016/0274252 A1* | 9/2016 | Moake | E21B 49/00 |
| 2017/0089846 A1* | 3/2017 | Guo | G01V 5/12 |
| 2017/0199298 A1* | 7/2017 | Hu | E21B 33/14 |
| 2018/0038990 A1* | 2/2018 | Hu | G01V 5/125 |
| 2018/0172876 A1* | 6/2018 | Inanc | G01V 5/045 |
| 2018/0188411 A1* | 7/2018 | Teague | G01V 5/12 |
| 2018/0245451 A1* | 8/2018 | Hu | G01V 5/101 |
| 2018/0329110 A1* | 11/2018 | Hu | G01V 5/125 |
| 2019/0048709 A1* | 2/2019 | Teague | G01N 23/203 |
| 2019/0049621 A1* | 2/2019 | Teague | G01V 5/104 |
| 2019/0063209 A1* | 2/2019 | Teague | G01N 9/24 |
| 2019/0085681 A1* | 3/2019 | Teague | G01V 5/12 |
| 2019/0265384 A1* | 8/2019 | Jurczyk | G01V 5/145 |
| 2020/0132880 A1* | 4/2020 | Inanc | G01V 5/12 |
| 2020/0182052 A1* | 6/2020 | Hu | E21B 47/0025 |
| 2021/0077414 A9* | 3/2021 | Gaspari | A61K 9/5089 |
| 2021/0208303 A1* | 7/2021 | Jurczyk | G01V 5/101 |
| 2022/0043178 A1 | 2/2022 | Knizhnik | |
| 2022/0373484 A1 | 11/2022 | Rego et al. | |
| 2023/0075550 A1* | 3/2023 | Zhan | G01V 5/105 |
| 2023/0203936 A1* | 6/2023 | Teague | E21B 47/0025 166/250.01 |

OTHER PUBLICATIONS

International Search Report and Written Opinion issued in PCT Application No. PCT/US2024/040412, Nov. 15, 2024 (9 pages).

* cited by examiner

SYSTEM AND METHOD FOR A CEMENT AND CASING FLAW DETECTOR WITH MULTI-SIZED

BACKGROUND

1. Field of Invention

The disclosure herein relates in general to equipment used in the oil and gas industry, and in particular, to a cement and casing flaw tool having multi-sized windows and with contrast suppression.

2. Description of the Prior Art

A wellbore is a structure formed in subterranean or underwater geologic structures, or layers. Such subterranean or underwater geologic structures may be subject to cemented multistring completions. A gamma ray scanner may be used in detecting the flaws in cement in such multistring completions. In completed wellbores, a tool having a gamma ray scanner is likely to be positioned away from a center of the completed wellbore. An axis of rotation of the tool is to be off-centered. One outcome of a tool rotating at an off-center rotation axis is that a sinusoidal background may be generated in a scan performed. The count rates obtained may be low at an angle where a face of the tool is closer to the cement but may be relatively higher at an angle where the tool face is far from the cement and where a significant amount of fluid may be between the tool and the cement. This usually causes degradation in a visual representation where flaw detection using the visual representation becomes difficult. Although there might be some image processing approaches for mitigating a sinusoidal background influence, for instance, in the visual representation, not having such influence removes post-processing and other possible effects. The tool may be rotated with a rotation axis at a borehole center but with most boreholes this may not be the case.

SUMMARY

In at least one embodiment, a system and a tool to determine flaws in cement and casing associated with a formation is disclosed. The tool includes a single scintillating crystal to receive gamma rays returned from a formation and a wellbore. The tool also includes a rotating shield having at least two windows that are of different sizes and that are diametrically opposite to each other. The gamma rays are received through the two windows simultaneously. The system further includes at least one processor and memory having instructions that when executed by the at least one processor causes the at least one processor to determine first gamma counts associated with the gamma rays received in the two windows at a first degree of alignment of the two windows with respect to an azimuth associated with the formation. The processor is also caused to determine second gamma counts associated with the gamma rays received in the two windows at a second degree of alignment of the two windows with respect to the azimuth. Further, the second degree of alignment is offset from the first degree of alignment. The processor is further to generate a visual representation of the gamma rays to indicate the flaws in the cement. A background of the visual representation includes at least part of a contrast that is suppressed based in part on a gamma contrast range obtained from at least the first gamma counts and the second gamma counts.

In at least one other embodiment, a system including one or more processing units to generate a visual representation of gamma rays received simultaneously in at least two windows of a rotating shield of a tool that includes a single scintillating crystal. The gamma rays are returned from a formation and a wellbore. The at least two windows are of different sizes and diametrically opposite to each other. The visual representation is to indicate flaws in cement and casing associated with a formation. A background of the visual representation includes at least part of a contrast that is suppressed based in part on a gamma contrast range obtained from at least first gamma counts and second gamma counts of the gamma rays. The first gamma counts are associated with the gamma rays received in the two windows at a first degree of alignment of the two windows with respect to an azimuth associated with the formation and the second gamma counts are associated with the gamma rays received in the two windows at a second degree of alignment of the two windows with respect to the azimuth. The second degree of alignment is offset from the first degree of alignment.

In yet another embodiment, a method for a system and a tool to determine flaws in cement and casing associated with a formation is disclosed. The method includes enabling a single scintillating crystal of the tool to receive gamma rays returned from a formation and a wellbore. The tool is associated with a rotating shield having at least two windows that are of different sizes and that are diametrically opposite to each other. The gamma rays are received through the two windows simultaneously. The method includes determining, using at least one processor, first gamma counts associated with the gamma rays received in the two windows at a first degree of alignment of the two windows with respect to an azimuth associated with the formation. The method also includes determining second gamma counts associated with the gamma rays received in the two windows at a second degree of alignment of the two windows with respect to the azimuth, where the second degree of alignment being offset from the first degree of alignment. The method includes providing a visual representation of the gamma rays to indicate the flaws in the cement and casing. Further, in the method, a background of the visual representation includes at least part of a contrast that is suppressed based in part on a gamma contrast range obtained from at least the first gamma counts and the second gamma counts.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

In at least one embodiment, a system and method herein can address such deficiencies raised and noted throughout herein by including a downhole tool for a cement and casing flaw detection using a tool having multi-sized windows and having contrast suppression. The tool may be a gamma ray scanner to be used in detecting flaws in cement and casing in multistring completions. One parameter sought in such flaw detection is an azimuthal positioning of the flaw. With that parameter, a method herein for cement and casing flaw detection can scan a wellbore azimuthally to locate the flaw. As such, in completed wellbores, the system and method herein allow for the tool to be positioned away from the center of the wellbore or to be position with an axis of rotation of the tool that may be off-centered, either due to the positioning of a tubing, if there is a tubing, or positioning of the tool in an annulus of the wellbore, if there is only a single string of the casing associated with the wellbore.

The system and its associated method herein can address a sinusoidal background influence to suppress such an influence within a degree or a limit that may be determined from a gamma contrast range obtained from at least the first gamma counts and the second gamma counts generated using a modeled or example cement and casing of a formation, which is artificially created or generated. In at least one embodiment, instead of having a single window in front of the gamma ray scanner of a tool, a second window that is of a different size and that is diametrically opposite (such as, 180 degrees) from a first window can be provided on the gamma ray scanner of a tool.

Further, the first window may be a main detector window of the tool that may be aligned with a gamma ray source collimator. Further, a visual representation of flaws may be provided by differing contrasts formed from a sinusoidal pattern of gamma counts. There may be areas of less contrasts, such as areas not having an apparent edge to clearly indicate a flaw in the formation, where a flaw includes voids that may have fluid therein versus solid structure. While post-processing may be performed, it causes adjustments throughout a visual representation and, therefore, affected other areas that should be left untouched.

Further, the second window is 180 degrees from, not only the main detector window, but also from scattered gamma rays emitted toward the formation. A main detector window may be aligned with the gamma ray beam when illuminating a target volume or formation. In one example, gamma rays from a formation and a wellbore is received to a single scintillating crystal. To enable the multi-sized windows to receive the gamma rays simultaneously, the multi-sized windows are provided on a rotating shield. The rotating shield can be set at a first depth with a large window facing a point in the formation, followed by a rotation so that the small window faces the same point. This can be repeated for different points at the first depth to provide different observations. Then similar observations are generated at a second depth, and so on. An axial positioning of the detector windows and their relative dimensions in a z-direction may be tracked over multiple observations. A visual representation may be generated based at least in part on a cumulation of the different observations.

In at least one embodiment, a tool having multi-sized windows can generate count rate profiles as a function of different azimuth for the different windows with the gamma rays received simultaneously through both windows. For example, a first one of the multi-sized windows may be larger relative to a second one of the multi-sized windows. The first one of the multi-sized windows may be made to face directly into formation or directed in a first azimuth of the formation, but a count generated from this single window alone may be low. In such a position, the second one of the windows will face into borehole (away from a formation) and count rates may be recorded that are higher (than when facing the formation) to increase the total count rates to a higher level compared to using only a single window.

However, providing the second one of the multi-sized windows as a small window but that also faces directly into formation at a second azimuth that is opposite the first azimuth, to receive gamma rays simultaneously with the first one of the multi-sized windows facing a fluid, causes higher counts to be generated for that position of the multi-sized windows relative to a single window. The increase in counts may be due to the second window in this second azimuth but may be lower compared to an increase in counts in the first azimuth. For example, a window facing into or directed towards a fluid provides more counts than facing into or directed towards the formation. Therefore, a large window that is facing into or directed towards a fluid or formation and, simultaneously, an opposite looking smaller window facing into or directed to the formation or fluid provide a count that would be lesser but more meaningful used cumulatively with different azimuths of the same two windows than two windows of the same size being opposite to each other. When facing the formation, the large window generates a lower count, in the absence of fluid, but because the opposite looking small window is facing the fluid, the lower count is increased as the count is determined simultaneously.

As there are different media along with the differently sized windows in use, the counts realized is more meaningful. With the higher counts obtained, irrespective of which window is facing the fluid or the formation, relative to a single window or single sized windows, the two differently sized windows enable counts that can cause a magnitude of a sinusoidal influence to be suppressed in a visual representation of the flaws. For example, two windows of the same size will only secure offset data (or data having a multiplier). Whereas the use of differently sized windows to simultaneously receive gamma rays provide data that is scaled without a fixed multiplier. Therefore, an increase that is meaningful at otherwise low count regions may be generated as a result of the multi-sized windows. In addition, as the count rates increase, differences between count profiles for a smaller fraction of the overall count rates may be achieved. The difference, however, forms a larger fraction of the counts at lower count azimuths.

In at least one embodiment, a contrast profile for a visual representation may include a contrast that is adjusted by a gamma contrast range. For example, the first and the second gamma counts may be used to generate a visual representation of the gamma rays to indicate the flaws in the cement and casing. A background of the visual representation may include at least part of a contrast that is suppressed based in part on the gamma contrast range obtained from at least the first gamma counts and the second gamma counts. In at least one embodiment, the gamma contrast range includes a gamma count that is in the range from about 900 to about 3000. However, in at least one embodiment, the gamma contrast range includes a gamma count that is in the range from about from about 300 to about 10,000; about 600 to about 5000; about 900 to about 3000; or about 1200 to about 2000.

In one example, a contrast value for a tool with a single window may be around 4.6 absolute units, a tool with a double window provides a gamma contrast value of the gamma contrast range that can change the contrast to reduce it to 3.7 absolute units. This change (such as, a decrease) in contrasts using the gamma contrast range, enables specific changes to the contrast of a visual representation of a formation. In particular the changes occur in areas having flaws or requiring clarity to determine flaws and other detection aspects described herein while leaving other areas with nominal changes. This is different that the generalized contrast changes from a single window tool or from post-processing. The specific contrast changes allows large contrast images, such as described further with respect to at least FIGS. 4B, 4C, to have a magnitude of sinusoidal influence therein suppressed. Therefore, a visual representation of the flaws is presented with further clarity.

As such, cement and casing flaw detection using a tool having multi-sized windows and having contrast suppression includes differently sized multiple windows to adjust, such as decrease, a contrast in specific areas of a visual representation. This approach alleviates a sinusoidal background influence on the visual representation, such as on presented images of flaws in a formation. The tool that includes a scanner (made of a rotating shield and a single scintillating crystal) can be used for detecting flaws in cement and casing within multistring completions. The tool can also be used for detecting a top of a cement and casing, for detecting tool and tubing eccentricity, and for detecting casing and tubing flaws.

Figure 1:
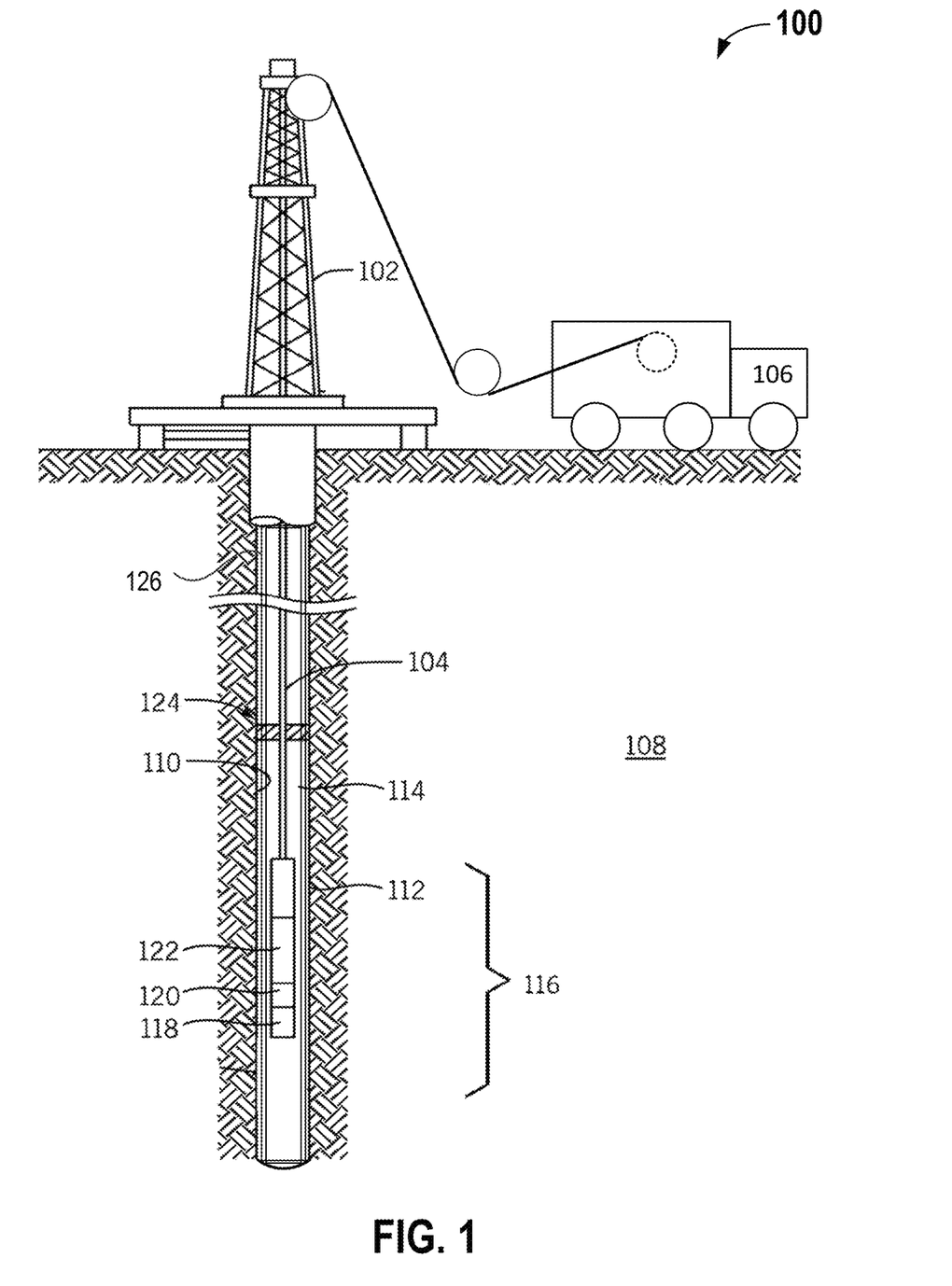
FIG. 1 illustrates an example downhole environment subject to cement and casing flaw detection using a system having a tool with multi-sized windows and having contrast suppression, in at least one embodiment herein.

FIG. 1 illustrates an example environment 100 subject to determinations associated cement and casing flaw detection and other detections described throughout herein, but beneficially, in a downhole environment, in at least one embodiment herein. In FIG. 1, the environment 100 includes a rig 102 and a supporting vehicle 106 to include at least part of a system of the disclosure herein and to support the method of the disclosure herein. However, other configurations such surface equipment may be used to support the method and system herein.

A downhole environment 108 is illustrated as associated with a wellbore 124 for any well-operation or is part of a drilling operation that was previously performed, that is ongoing, or that is to be performed. The downhole environment 108 may include barriers or completions 126 having annular spaces (or annulus) with an applied filling, such as water and cement, and/or with natural filling, such as oil, water, and gas. For certain well-operations, the cement may be used to seal an annulus. In one example, an annulus that is a space between the wellbore 124 and casings (including their collars) of the barriers 126 that may be filled with cement for sealing purposes.

Further, several casing of the barriers 126 may be coupled together using collars to stabilize features of the wellbore 124. The casings may be pipes of different or same length that are provided together to reach the depths in the downhole environment 108. The surface equipment 102, 104 may be used for logging operations associated with conditions of the wellbore 124, for instance. These operations may also include detecting and monitoring conditions of the wellbore 124. The operations may include measuring of parameters of downhole environment 108 and/or, specifically, of the wellbore 124 or the completions or barriers 126. The parameters may be related to cement or casing flaws, and to other evaluation used to ensure a soundness of the cement filling and the isolation offered by such cement filling in the wellbore 124. In at least one embodiment, to perform such soundness evaluation, one or more gamma ray logging tools 118-122 maybe part of a downhole tool 116 deployed via a cable 104. In at least one embodiment, the downhole tool 116 tool is provided at the center 114 of the barriers 126 made of at least one exterior casing 110 that interfaces with a surface of the downhole environment 108.

In at least one embodiment, the gamma ray logging tools or detectors 118-122 may be part of a downhole tool 116 that may be lowered by a cable 104 using spools of a supporting vehicle 106. The cable 104 may be a mechanical cable. However, an electrical or an electro-optical cable may be also used. The electro-optical cable may include fiber optics and may be protected against the downhole environment 108. In at least one embodiment, the downhole tool 116 may be lowered using coiled tubing.

In at least one embodiment, the one or more acoustic logging tools 118-122 at least includes at least part of a system herein for determinations associated with cement and casing flaws, with detection of a top of a cement, with detection of tool and tubing eccentricity, and with detection of casing and tubing flaws, in a downhole environment. In at least one embodiment, the downhole tool 116 transmits data to the surface to be processed in the vehicle 106 or in a remote location than the location of wellbore 124. Further, the downhole tool 116 may store or process in part the data received. Aspects of such storing and processing features in such a system in FIG. 1 is detailed in FIG. 6.

Figure 6:
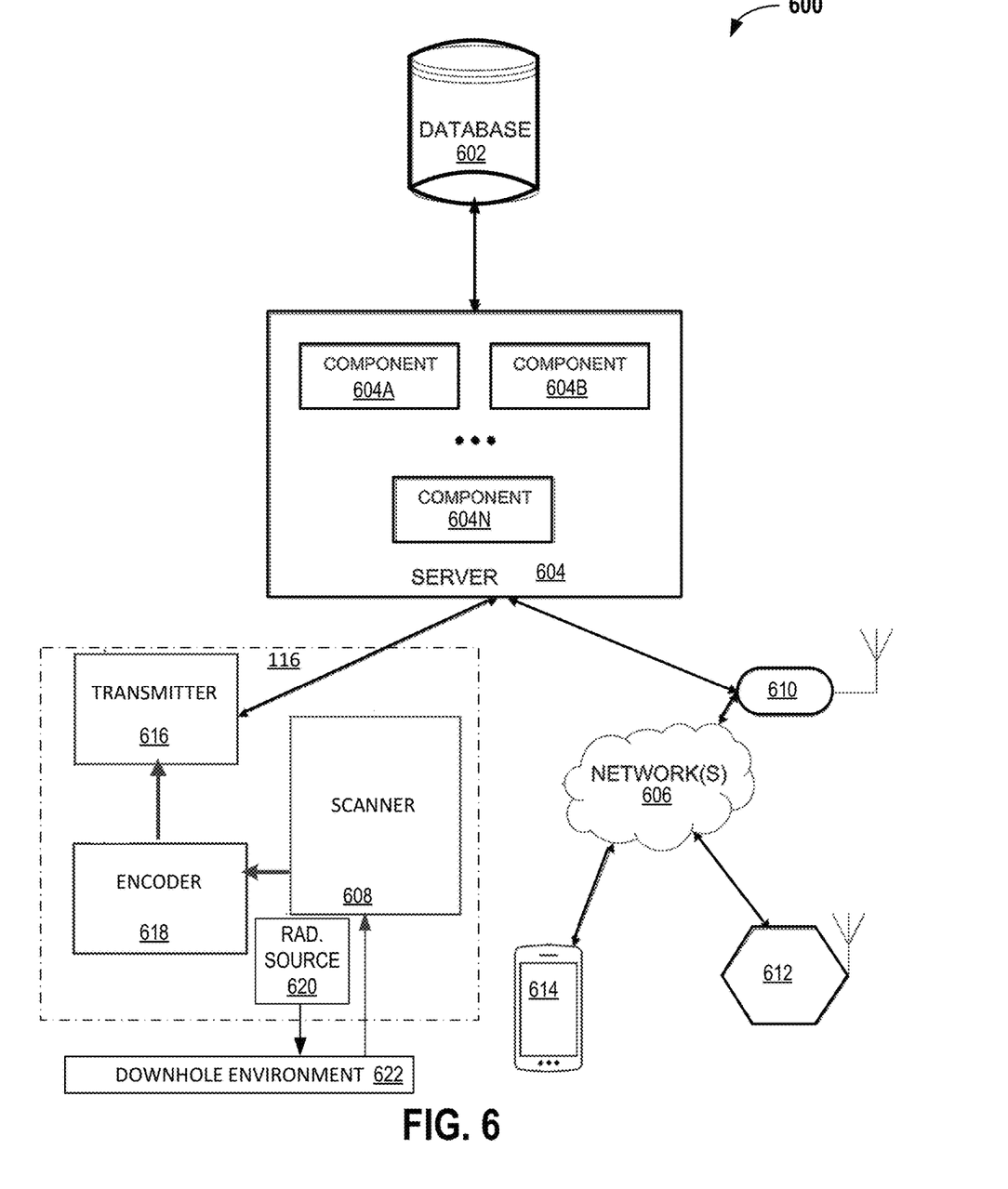
FIG. 6 illustrates a system for cement and casing flaw detection using a system having a tool with multi-sized windows and having contrast suppression, according to at least one embodiment.

In at least one embodiment, a method for data handling in downhole operations includes providing a downhole tool, such as described in FIGS. 1 and 6, to receive signals (such as gamma ray (GR) signals or return signals of scattered gamma rays emitted toward the formation) from a downhole environment. The signals may be return signals, in one example, that are related to applied signals from a downhole tool 116 that are applied to the downhole environment. Data underlying the visual representations and plots in FIGS. 4B, 4C may be retrieved in a downhole tool from such signals.

In at least one embodiment, even though illustrated in the visual representations and plots in these figures, the underlying data from the signals alone may be used by the system and method described herein. In at least one embodiment, for example, a single crystal scintillator and a photomultiplier may be coupled to a processor and can execute instructions from a memory to determine count related information to be part of the data.

Figure 2:
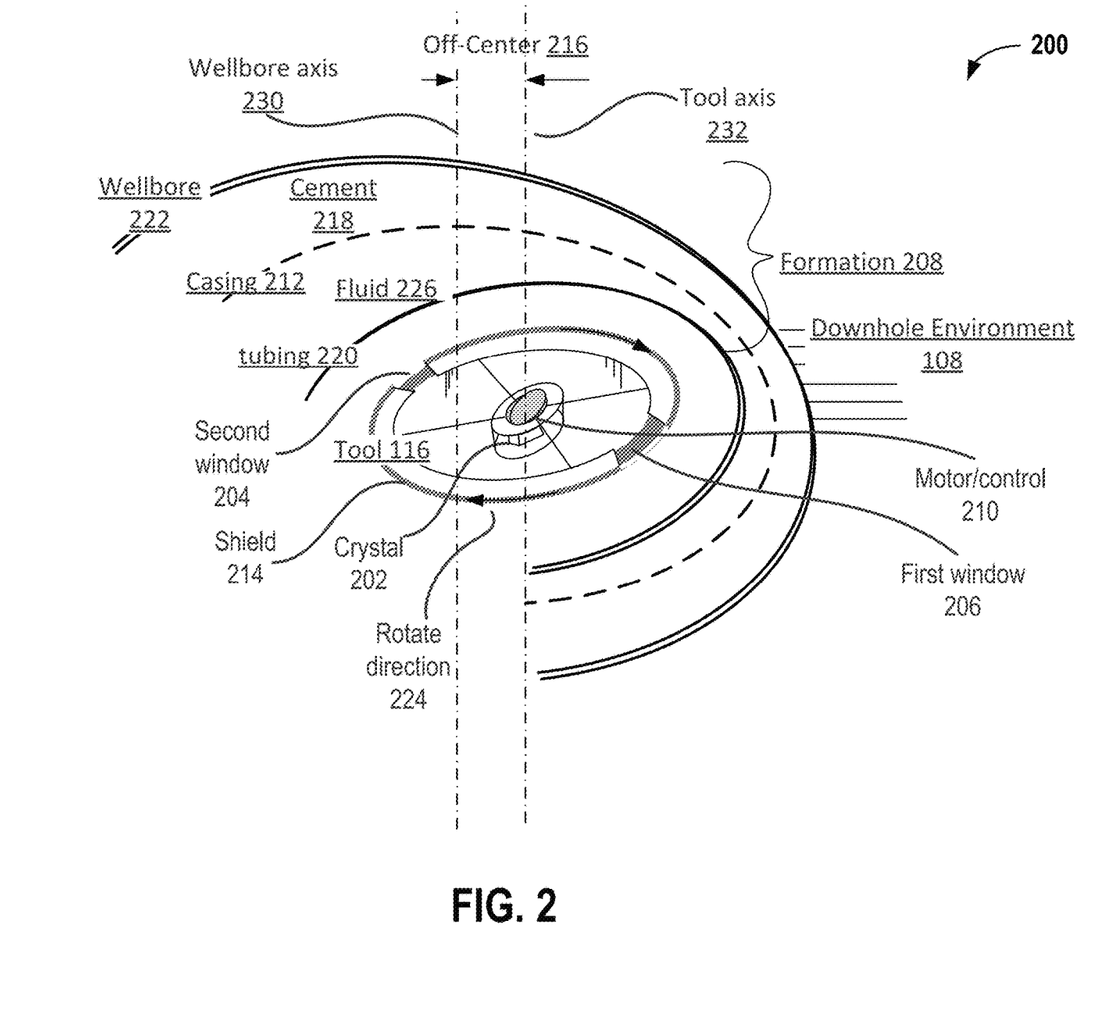
FIG. 2 illustrates aspects of a system for cement and casing flaw detection using a system having a tool with multi-sized windows and having contrast suppression, in at least one embodiment herein.

FIG. 2 illustrates aspects 200 of a system for cement and casing flaw detection using a system having a tool with multi-sized windows and having contrast suppression, in at least one embodiment herein. The section 200 illustrated in FIG. 2 includes at least a downhole tool 116 having multi-sized windows 204, 206, and a single scintillating crystal 202 to receive gamma rays returned from a formation 208 and a wellbore 222, which may or may not include one or more casings 212 and/or one or more tubing 220. Further, the downhole tool 116 may include a motor/control 210 aspects to cause a shield 214 having the multi-sized windows 204, 206 to be moved or rotated to an appropriate orientation or horizontal alignment with a respect to one or more points associated with the formation 208. Further, the motor/control 210 aspects are illustrative and not to scale and so, any other arrangement may be readily understood to a skilled artisan that can allow a shield 214 to rotate relative to the single scintillation crystal 202. The control aspects associated with the motor may be programmed to cause the motor to perform such movements or rotations in advance or may be caused to dynamically change such movements or rotations to cause observations to be received from different depths and orientations (or horizontal alignments) in the downhole environment 108.

The one or more casing 212 may include cement 218 filled behind the casing or that is part of the casing. Further, there may be fluid 226 that is distinct form cement 218 in between the casing 212 and the tubing 220, as illustrated in FIG. 2. The fluid 226 may be one or more of water, mud, and hydrocarbons. A scanner of the tool 116 may include at least the single scintillating crystal 202, the shield 214, the motor/control aspects 210, and a processor to perform instructions from a memory as further described and illustrated with respect to FIG. 6. In at least one embodiment, the tool 116 may be used to detect flaws in the cement 218 by detecting areas having fluid within the cement 218, where such fluid is not supposed to be present. For example, fluid within the cement 218 may be an indication of voids or other improprieties in the cement 218. In addition, the tool 116 may be used to detect other aspects associated with the cement, including detecting a top of the cement 218 as the tool 116 is being lowered into or being removed from a wellbore 124, detecting tool and tubing eccentricity, and detecting tubing 220 flaws.

In at least one embodiment, the shield 214 prevents returned gamma rays from reaching the crystal 202 in any other areas than in the multi-sized windows 204, 206. As also illustrated in FIG. 2, an axis 232 of rotation of the tool 116 may be off-centered 216 with respect to an axis 230 of the wellbore 222. However, as the gamma rays are received through the multi-sized windows 204, 206, any sinusoidal background that may be generated in a scan performed by the downhole tool 116 may be subject to a suppression by a gamma contrast range obtained from at least first gamma counts and second gamma counts from the multi-sized windows 204.

Figure 3:
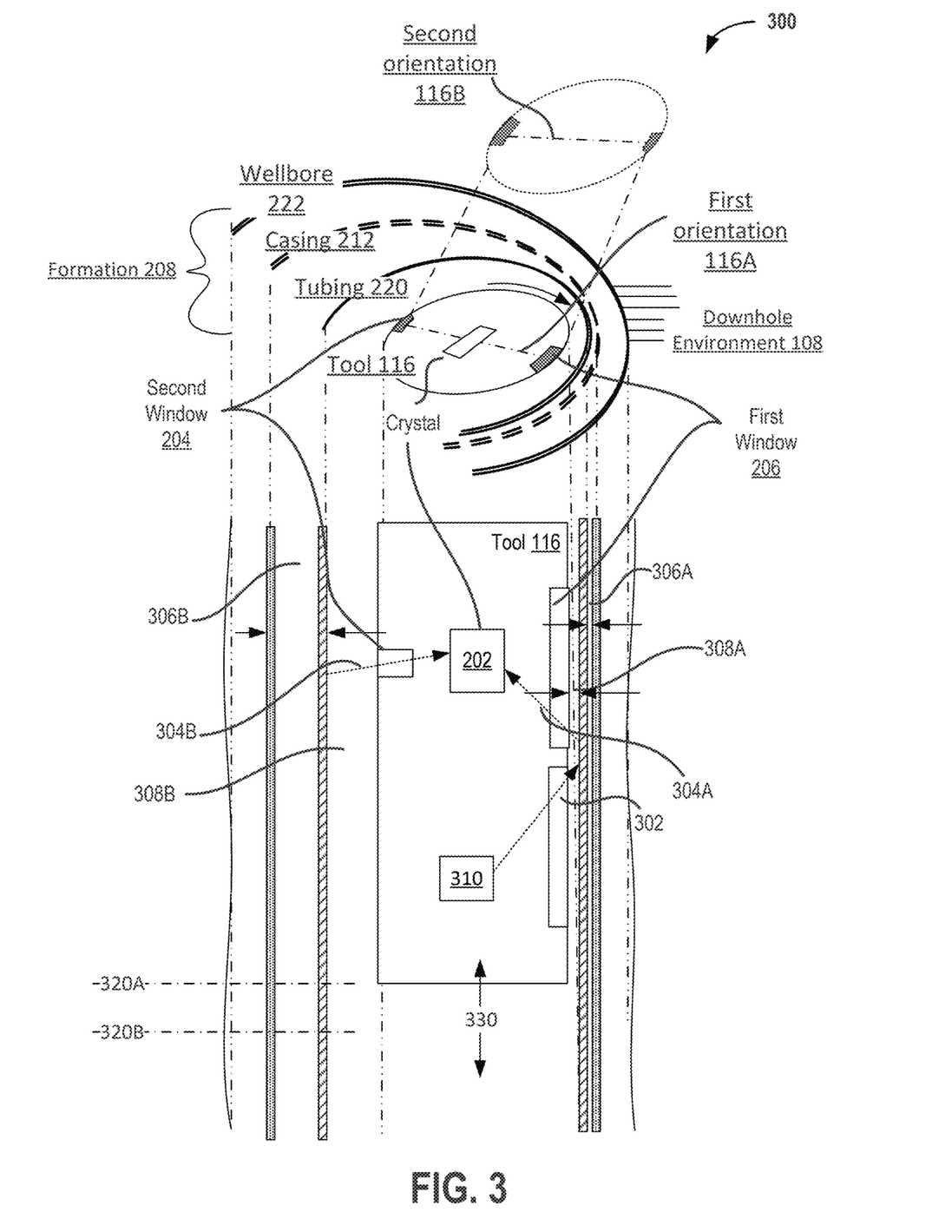
FIG. 3 illustrates further aspects of a system for cement and casing flaw detection using a system having a tool with multi-sized windows and having contrast suppression, in at least one embodiment herein.

FIG. 3 illustrates further aspects 300 of a system for cement and casing flaw detection using a system having a tool with multi-sized windows and having contrast suppression, in at least one embodiment herein. The further aspects 300 include a side view to illustrate, in part, that one or more of the tubing 220, the casing 212, or the tool 116 may be off-centered 216 with respect to the wellbore 222. As such, there may be a first spacing 306A between the tubing 220 and the casing 212 that is lesser than a second spacing 306B on a side opposite to the first spacing. Similarly, there may be a first spacing 308A between the tool 116 and the tubing 220 that is lesser than a second spacing 308B on a side opposite to this first spacing. As a result of such different spacing, a rotation of the tool 116 may be off-centered and an outcome of a tool 116 rotating at an off-center rotation axis is that a sinusoidal background may be generated in a scan performed with gamma rays 304A, B received in a single scintillating crystal 202 from scattered gamma rays 302 emitted from a radiation source 310. Further, a subject of the flaw detection using the gamma rays 304A, B may therefore be any feature 212, 220, 222 of the formation 208.

The downhole tool 116 or at least one or more aspects of the scanner may be moved 330 into the wellbore at different depths 320A, B at which to study the formation 208 and wellbore 222. In at least one embodiment, the tool 116 moves in a spiral manner from depths 32A to 320B which receiving gamma rays. As such, the gamma rays need not be collected for 360 degrees of a single depth 320A; 320B. In addition, the downhole tool 116 may be rotated in one or more directions 224 to allow gamma rays to be projected out to the formation 208 and to be received through the multi-sized windows 204, 206 at the same time at each of different orientations or horizontal alignments of the downhole tool 116. The orientations may be from a 0 degrees to 360 degrees, also referred to as azimuth locations or horizontal alignments, at each depth point 320A, B. For example, once the downhole tool 116 is at a first depth 320A, then scattering of gamma rays 302 commences and detection of the gamma rays received 304A, B occurs through the multi-sized windows 204, 206 at different orientations or horizontal alignments of the downhole tool 116 at the first depth 320A. This process may be repeated at a second depth 320B and many other depths to provide the visual representation, as described with respect to FIGS. 4A-4C. However, for every point at every depth, observations are obtained at a first orientation or horizontal alignment 116A and then at a second orientation or horizontal alignment 116B that is 180 degrees displayed from the first orientation or horizontal alignment 116A.

Figure 4A:
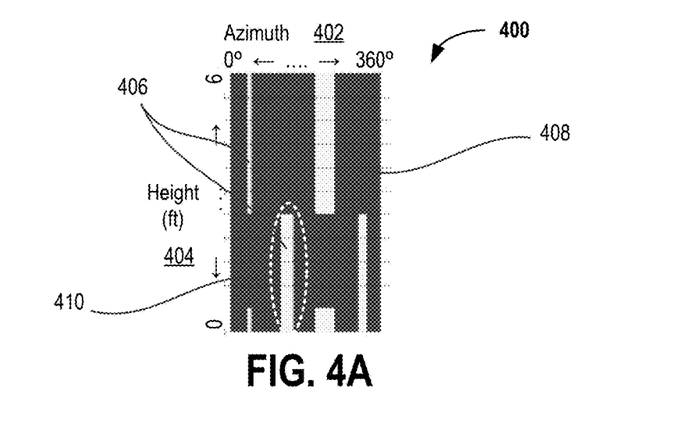
FIG. 4A illustrates example flaws mapped to a 2-dimensional image in an example cement subject to cement and casing flaw detection using a system having a tool with multi-sized windows and having contrast suppression, in at least one embodiment herein.

FIG. 4A illustrates example flaws 406 mapped to a 2-dimensional image in an example cement 400 subject to cement and casing flaw detection using a system having a tool with multi-sized windows and having contrast suppression, in at least one embodiment herein. While illustrated in a flat plain, the example formation 400 spans an azimuth 402 from a 0 degree orientation to a 360 degree orientation of a formation 208 in a downhole environment 108. In at least one embodiment, the example formation 400 may include a solid structure representing the a cement of the formation 408 and having therein the example flaws 406. Further, the example formation 400 may be a modelled formation for calibration of a tool to perform flaw detection.

For example, the tool may be subject to a calibration performed using modeled or example flaws 406 in the modeled or example formation 400 prior to being used downhole with the formation 208, where the calibration is to obtain an estimated adjustment to at least one aspect of the visual representation generated for the cement 218 of the formation 208. The estimated adjustment may be by a gamma contrast range obtained from at least first gamma counts and second gamma counts and that may be used with the visual representation generated from the cement 218 of the formation 208.

Figure 4B:
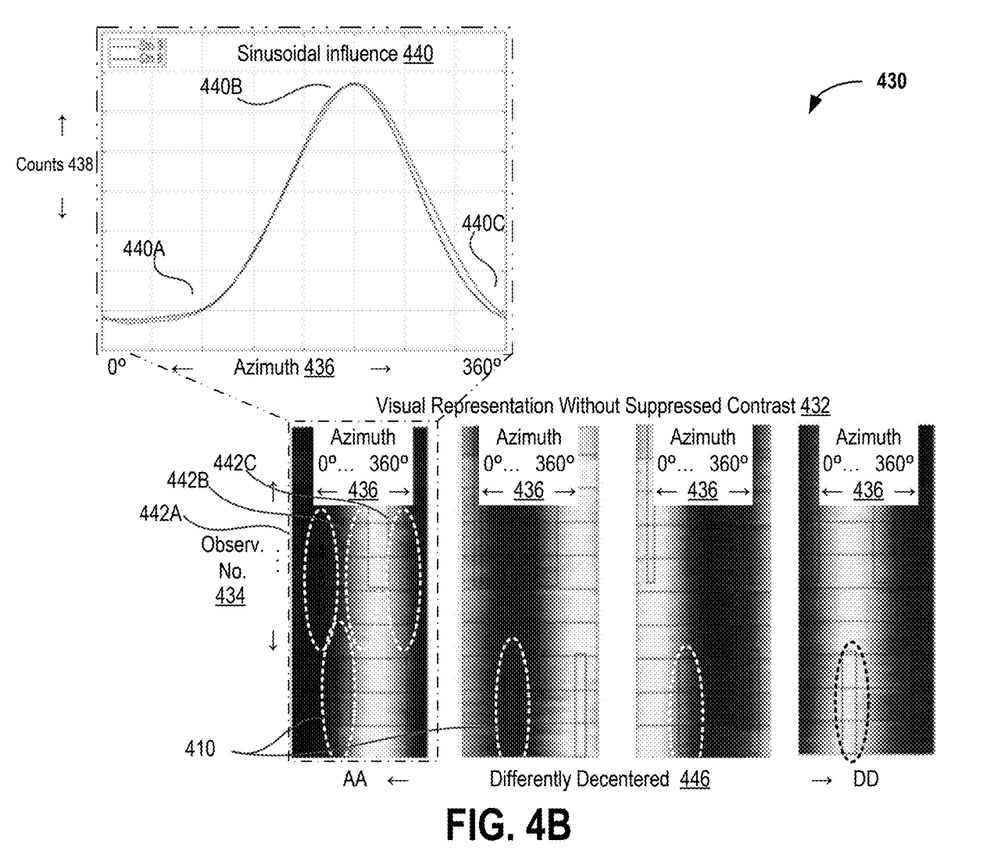
FIG. 4B illustrates aspects of visual representations from received gamma rays to indicate flaws in a formation, according to at least one embodiment.

FIG. 4B illustrates aspects 430 of visual representations 432 from the gamma rays to indicate flaws 406 in a cement of the formation 408, according to at least one embodiment. A downhole tool 116 may be lowered to different heights 404. The downhole tool 116 may be rotated to different azimuths 402. Gamma counts are obtained as observations 434 at one or more heights 404 and at one or more azimuths of the downhole tool 116 with respect to the example formation 400. The downhole tool 116 may be then removed and the data generated there from may be to enable calibration of the downhole tool 116, in one instance. At least one reference area 410 of the example formation 400 is illustrated from FIG. 4A to FIG. 4B to support the illustration of sinusoidal influence 440 in a visual representation that may be associated with the example formation 400. Further, the same procedure may be provided for a natural formation 208 of a downhole environment 108.

As illustrated in FIG. 4B, a sinusoidal influence 440 is a sine wave representation 440A-C of the visual representation that occurs as a result of the off-centered rotation of the downhole tool 116 with respect to the formation 208. The sine wave representation 440A-C corresponds to changes in contrasts in the visual representation where, instead of a flaw (such as of the reference area 410) in the example formation 400 causing a change in the contrast, entire vertical areas 442A-C in the visual representation may have changes in contrasts that are along a vertical axis between a first depth 320A and a second depth 320B. This detracts from an ability to determine a flaw in a cement and casing of the formation, based in part on the visual representation. Further, in FIG. 4B, the x-axis of the visual representation 432 includes decentered evaluation of the observations that are decentered to AA, BB, CC, or DD locations of the tool axis 232. This is in reference to the tool not being centered in the wellbore 222 and being centered to different locations of the tool axis 232. However, in each case, the sinusoidal influence 440 is apparent.

In at least one embodiment, a calibration may be made of the downhole tool 116, such as to determine a gamma contrast range to be used with the contrasts in a visual representation of a formation 208 in a downhole environment 108. In at least one embodiment, a processor may be used to execute instructions to determine first gamma counts 438 associated with gamma rays received in two windows 204, 206, at a first degree of alignment 116A of the two windows with respect to an azimuth 436 associated with the formation, such as an example formation 400.

The processor may be caused to also determine second gamma counts associated with the gamma rays received in the two windows at a second degree of alignment 116B of the two windows with respect to the azimuth. The second degree of alignment may be offset, such as, at an 180 degrees offset, from the first degree of alignment. A gamma contrast range may be obtained from or may be part of at least the first gamma counts and the second gamma counts. In at least one embodiment, the downhole tool 116 may be used in a downhole environment 108 to detect flaws and other aspects in a cement of the formation 208. The process for determining first gamma counts and second gamma counts may be performed from data obtained in the formation 208. Then, the processor is caused to generate a visual representation of gamma rays to indicate the flaws in the cement of the formation 208, wherein a background of the visual representation includes contrast that is adjusted based at least in part on a gamma contrast range obtained from at least the first gamma counts and the second gamma counts.

Figure 4C:
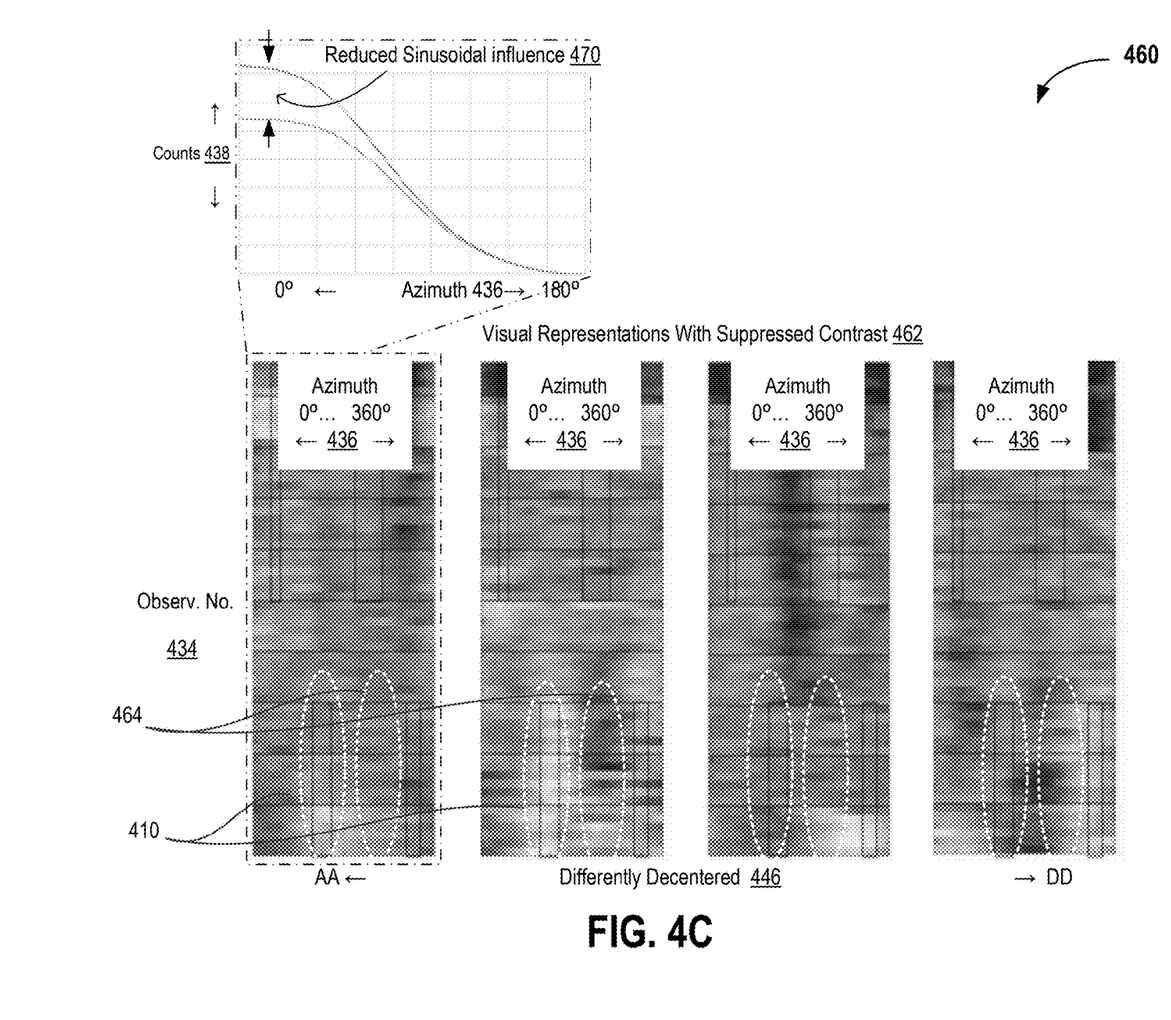
FIG. 4C illustrates aspects of visual representations having 2-dimensional mappings, from received gamma rays, to indicate flaws in a cement and casing associated with a formation, where a background of the visual representation has a contrast that is adjusted, according to at least one embodiment herein.

FIG. 4C illustrates aspects 460 of visual representations 462 having 2-dimensional mappings, from received gamma rays, to indicate flaws in a cement and casing of the formation, where a background of the visual representation has flattened sinusoidal aspects of a contrast therein, relative to FIG. 4B. For purposes of illustration and description, the flattening of sinusoidal aspects may be performed based in part on a contrast that is adjusted or suppressed 470 because of a gamma contrast range obtained from at least the first gamma counts and the second gamma counts, according to at least one embodiment herein. In at least one embodiment, the adjustment or suppression 470 is part of the gamma counts obtained without a need for further processing to separately cause the adjustment or suppression 470.

For example, the gamma contrast range can include a gamma count that is in the range from about 300 to about 10,000; about 600 to about 5000; about 900 to about 3000; or about 1200 to about 2000. The count rate ranges may be associated with (and can change with) one or more predetermined parameters. One set of the predetermined parameters may be related to a design of the tool 116, including to a size of the single scintillating crystal, a proximity of the single scintillating crystal to the radiation source, and the sizes of the windows in the shield. Additionally, the predetermined parameters may include borehole parameters, including a borehole diameter, eccentricity of the casing and tubing, and a casing and tubing thickness, which can all individual or altogether change the gamma contrast range. In at least one embodiment, the fluids present in the wellbore can also cause a change in the gamma contrast range as part of the predetermined parameters. In at least one embodiment, the eccentricity of the casing and tubing can influence not only on the background sinusoidal behavior in the contrast of the visual representation but can also influence selection of one or more of the above provided gamma contrast ranges that include the gamma count ranges. Therefore, the provided visual representation will include the adjustment in contrast as part of the gamma counts used to provide the visual representation. The reference area 410 of FIGS. 4A and 4B is also illustrated in the background in FIG. 4C to support an illustration of the adjustments to the sinusoidal influence 440 of FIG. 4B. For example, in FIG. 4C, the sinusoidal influence 440 of FIG. 4B has been adjusted or suppressed 470 because of a gamma contrast range obtained from at least the first gamma counts and the second gamma counts.

In at least one embodiment, the reduced sinusoidal influence 470 causes the visual representations 462 to have lesser ones of the vertical areas 442A-C include even changes in contrasts along a vertical axis between a first depth 320A and a second depth 320B. Instead, the sine wave representation in FIG. 4C corresponds to changes in contrasts in the visual representation where the flaw (such as of the reference area 410) causes a change in the contrast, instead of entire vertical areas 442A-C. This is also apparent by the darker contrasts in areas 464 corresponding to solid cement, such as from the example formation 400, versus the areas 410 having the flaws in the solid cement.

In at least one embodiment, contrasts obtained from the gamma counts in the multi-sized windows at each depth and at each azimuth (such as, orientation or horizontal alignment) may be adjusted by flattening sinusoidal aspects of a contrast of a background of the visual representation 462. In at least one embodiment, a gamma contrast range obtained from at least the first gamma counts and the second gamma counts can be used to provide the flattening of the sinusoidal aspects of a contrast of the background. In at least one embodiment, at least one of differences in the contrast of the visual representations 462 of the gamma rays, such as between two example areas 464, 410 on or more of the visual representation 462 may be used to indicate the flaws in the cement of the formation. Further, the adjusted contrast in the visual representations 462 of FIG. 4C is an adjustment to the at least one of the differences in the contrast.

Figure 5:
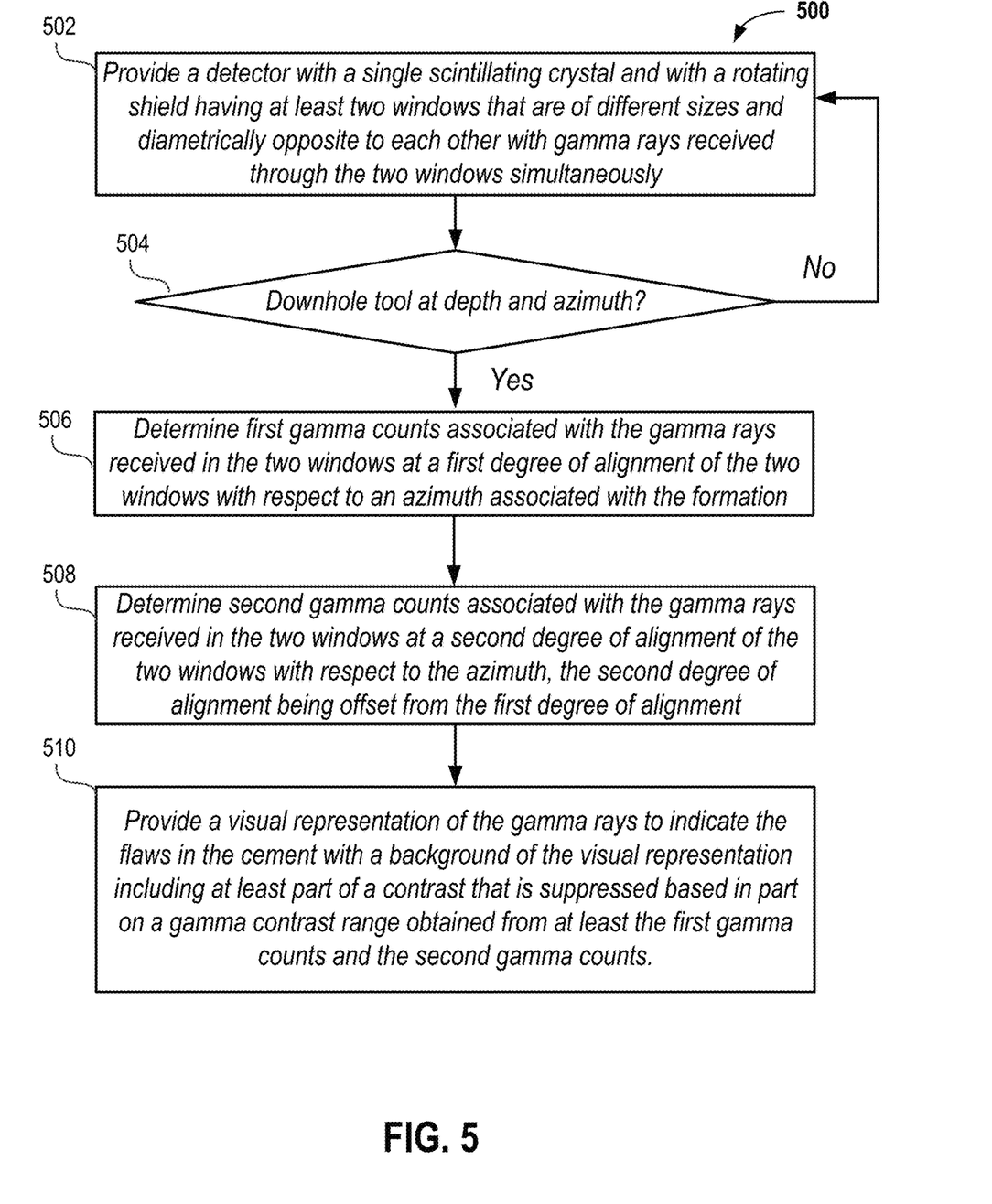
FIG. 5 illustrates a method for cement and casing flaw detection using a system having a tool with multi-sized windows and having contrast suppression, in at least one embodiment herein.

FIG. 5 illustrates a method 500 for cement and casing flaw detection using a system having a tool with multi-sized windows and having contrast suppression, in at least one embodiment herein. As discussed in reference to at least FIGS. 2 to 4C, the method 500 includes providing (502) a tool to determine flaws in a cement of the formation. The tool includes or is associated with a single scintillating crystal and with a rotating shield having at least two windows that are of different sizes and that are diametrically opposite to each other. The gamma rays are received through the two windows simultaneously and correspond to scattered gamma rays emitted toward the formation.

In at least one embodiment, the method 500 includes determining or verifying (502) that the tool is at an intended depth and azimuth. The method 500 includes determining (506), using at least one processor, first gamma counts associated with the gamma rays received in the two windows at a first degree of alignment of the two windows with respect to an azimuth associated with the formation. The method 500 includes determining (508) second gamma counts associated with the gamma rays received in the two windows at a second degree of alignment of the two windows with respect to the azimuth. The second degree of alignment is offset from the first degree of alignment.

In at least one embodiment, the method 500 includes providing (510) a visual representation of the gamma rays to indicate the flaws in the cement. Further, in step 510, a background of the visual representation includes at least part of a contrast that is suppressed based in part on a gamma contrast range obtained from at least the first gamma counts and the second gamma counts. For example, the contrast that is suppressed includes, at least in part, flattened sinusoidal aspects of the contrast in the background of the visual representation.

In at least one embodiment, the method 500 includes a further step or sub-step for the adjusted contrast to include a gamma contrast range obtained from at least the first gamma counts and the second gamma counts. In at least one embodiment, the method 500 includes a further step or sub-step for the gamma contrast range to include a gamma count that is in the range from about 900 to about 3000 or from about 600 to about 5000.

In at least one embodiment, the method 500 includes a further step or sub-step for the first gamma counts and the second gamma ray counts to be associated with different observations conducted at different times using the tool. In at least one embodiment, the method 500 includes a further step or sub-step for the tool to be subject to a calibration performed using modeled flaws in a modeled cement of a modeled formation prior to being used downhole with the formation. The processor is able to use the calibration to obtain an estimated adjustment to at least one aspect of the visual representation generated for the formation.

In at least one embodiment, one or more processing units, such as described in FIG. 6, may be used to generate a visual representation of gamma rays received simultaneously in at least two windows of a rotating shield of a tool. The tool may include the single scintillating crystal and the gamma rays returned from a formation may be based in part on scattered gamma rays emitted by a radiation source in the tool and towards the formation. Further, as described in FIGS. 2 and 3 herein, the at least two windows are of different sizes and are diametrically opposite to each other. The visual representation generated can be used to indicate flaws in the cement of the formation because it has a background that includes contrast that is adjusted based at least in part on a gamma contrast range obtained from at least the first gamma counts and the second gamma counts. The first gamma counts are associated with the gamma rays received in the two windows at a first degree of alignment of the two windows with respect to an azimuth associated with the formation and the second gamma counts are associated with the gamma rays received in the two windows at a second degree of alignment of the two windows with respect to the azimuth, where the second degree of alignment is offset from the first degree of alignment.

FIG. 6 illustrates a system 600 for cement and casing flaw detection using a system having a tool with multi-sized windows and having contrast suppression, according to at least one embodiment. The system 600 may include computer and network aspects. In at least one embodiment, these computer and network aspects 600 may include a distributed system. In at least one embodiment, a distributed system 600 may include one or more computing devices 612, 614. In at least one embodiment, one or more computing devices 612, 614 may be adapted to execute and function with a client application, such as with browsers or a stand-alone application, and are adapted to execute and function over one or more network(s) 606, which may include downhole inter-tool communications and telemetry to surface (such as using mudpule, electromagnetic telemetry), with w receiver on a surface being capable of telemetry acquisition.

In at least one embodiment, a server 604, having components 604A-N may be communicatively coupled with computing devices 612, 614 via network 606 and via a receiver device, if provided. In at least one embodiment, components 612, 614 include processors, memory, and random-access memory (RAM). In at least one embodiment, server 604 may be adapted to operate services or applications to manage functions and sessions associated with database access 602 and associated with computing devices 612, 614. In at least one embodiment, a server 604 may be associated with a detector or scanner 608 of a downhole tool 116, which can include a single crystal scintillator. In at least one embodiment, a photomultiplier 618 may be associated with the downhole tool 116.

In at least one embodiment, an encoder and transmitter 616 may be associated with the photomultiplier 618. In at least one embodiment, an encoder and transmitter 616 may include a processor and memory having instructions that when executed by the processor can cause the encoder and transmitter 616 to perform encoding functions described throughout herein and at least in reference to FIG. 5.

In at least one embodiment, a server 604 may be at a wellsite location, but may also be at a distinct location from a wellsite location to perform decoding functions described throughout herein and at least in reference to FIG. 4B. In at least one embodiment, such a server 604 may support a downhole tool 116 for cement and casing flaw detection in downhole operations performed in a downhole environment 622. Such a tool 116 may operate partly downhole and partly at a surface environment. Such a tool 116 may include subsystems to perform functions described throughout herein.

The subsystems may be modules that may be able to test or train a system on a surface level using a gamma contrast range obtained from at least first gamma counts and second gamma counts associated with a modeled or example formation provided from cement and including artificial flaws. Further, predetermined fitting curves generated from the gamma contrast ranges may be used as an activation function to adjust a sinusoidal influence of data from a downhole environment. The subsystem may be encased in one or more computing devices having at least one processor and memory so that the at least one processor can perform functions based in part on instructions from the memory executing in the at least one processor. In at least one embodiment, even though illustrated together, the system boundary 618 may be part of a tool 116 and an encoder and transmitter 616. In at least one embodiment, the server 604 and computing devices 610-614 may be in different geographic locations, including downhole and surface areas.

A detector or scanner 608, having a single scintillating crystal, of a downhole tool 116 is provided to detect cement flaws in a downhole environment 622. For example, the downhole tool 116 can emit gamma rays into the downhole environment 622 using a radiation source 620 and a scanner 608 may be a single scintillating crystal associated with a rotating shield having multi-sized windows. In at least one embodiment, a system for cement and casing flaw detection in a downhole environment includes a logging while drilling (LWD) system for the analysis, where such a system may be adapted to transmit, either through wires or wireless, information received therein, from a downhole environment to a surface environment. In at least one embodiment, modeling in an encoder and transmitter 616 can be performed using different predetermined fitting curves may allow further variations to the predetermined fitting curves than just slope and intercept variations.

The encoder and transmitter 616 can communicate with a photomultiplier 618 which communicates with a crystal scintillator in a detector or scanner 608. In at least one embodiment, each predetermined fitting curve may require specific input from a server 604 to be used to fit input received from gamma-ray signals. In at least one embodiment, trained ML/AI algorithms may be used with each predetermined fitting curve forming an activation function to classify logarithmic data of different energy windows of the signals. In at least one embodiment, a least error may reinforce the use of the same predetermined fitting curve for future data of different energy windows of the signals.

In at least one embodiment, one or more component 604A-N may be adapted to function as a signal provisioning or detector device within a server 604. In at least one embodiment, one or more components 604A-N may include one or more processors and one or more memory devices adapted to function as a detector or receiver device, while other processors and memory devices in server 604 may perform other functions.

In at least one embodiment, a server 604 may also provide services or applications that are software-based in a virtual or a physical environment (such as to support the simulations referenced herein). In at least one embodiment, when server 604 is a virtual environment, then components 604A-N are software components that may be implemented on a cloud. In at least one embodiment, this feature allows remote operation of a system for cement and casing flaw detection using an LWD system in real time that relies on a downhole tool, as discussed at least in reference to FIGS. 1-5. In at least one embodiment, this feature also allows for remote access to information received and communicated between any of aforementioned devices. In at least one embodiment, one or more components 604A-N of a server 604 may be implemented in hardware or firmware, other than a software implementation described throughout herein. In at least one embodiment, combinations thereof may also be used.

In at least one embodiment, one computing device 610-614 may be a smart monitor or a display having at least a microcontroller and memory having instructions to enable display of information monitored by a detector. In at least one embodiment, one computing device 610 may be a transmitter device to transmit directly to a receiver device or to transmit via a network 606 to a receiver device that may be part of an encoder and transmitter 616 and to transmit to a server 604, as well as to other computing devices 612, 614.

In at least one embodiment, other computing devices 612, 614 may include portable handheld devices that are not limited to smartphones, cellular telephones, tablet computers, personal digital assistants (PDAs), and wearable devices (head mounted displays, watches, etc.). In at least one embodiment, other computing devices 612, 614 may operate one or more operating systems including Microsoft Windows Mobile®, Windows® (of any generation), and/or a variety of mobile operating systems such as iOS®, Windows Phone®, Android®, BlackBerry®, Palm OS®, and/or variations thereof.

In at least one embodiment, other computing devices 612, 614 may support applications designed as internet-related applications, electronic mail (email), short or multimedia message service (SMS or MMS) applications and may use other communication protocols. In at least one embodiment, other computing devices 612, 614 may also include general purpose personal computers and/or laptop computers running such operating systems as Microsoft Windows®, Apple Macintosh®, and/or Linux®. In at least one embodiment, other computing devices 612, 614 may be workstations running UNIX® or UNIX-like operating systems or other GNU/Linux operating systems, such as Google Chrome OS®. In at least one embodiment, thin-client devices, including gaming systems (Microsoft Xbox®) may be used as other computing device 612, 614.

In at least one embodiment, network(s) 606 may be any type of network that can support data communications using various protocols, including TCP/IP (transmission control protocol/Internet protocol), SNA (systems network architecture), IPX (Internet packet exchange), AppleTalk®, and/or variations thereof. In at least one embodiment, network(s) 606 may be a networks that is based on Ethernet, Token-Ring, a wide-area network, Internet, a virtual network, a virtual private network (VPN), a local area network (LAN), an intranet, an extranet, a public switched telephone network (PSTN), an infra-red network, a wireless network (such as that operating with guidelines from an institution like the Institute of Electrical and Electronics (IEEE) 802.11 suite of protocols, Bluetooth®, and/or any other wireless protocol), and/or any combination of these and/or other networks.

In at least one embodiment, a server 604 runs a suitable operating system, including any of operating systems described throughout herein. In at least one embodiment, server 604 may also run some server applications, including HTTP (hypertext transport protocol) servers, FTP (file transfer protocol) servers, CGI (common gateway interface) servers, JAVA® servers, database servers, and/or variations thereof. In at least one embodiment, a database 602 is supported by database server feature of a server 604 provided with front-end capabilities. In at least one embodiment, such database server features include those available from Oracle®, Microsoft®, Sybase®, IBM® (International Business Machines), and/or variations thereof.

In at least one embodiment, a server 604 is able to provide feeds and/or real-time updates for media feeds. In at least one embodiment, a server 604 is part of multiple server boxes spread over an area but functioning for a presently described process for analysis of a porous formation. In at least one embodiment, server 604 includes applications to measure network performance by network monitoring and traffic management. In at least one embodiment, a provided database 602 enables information storage from a wellsite, including user interactions, usage patterns information, adaptation rules information, and other information.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

Terms such as a, an, the, and similar referents, in context of describing disclosed embodiments (especially in context of following claims), are understood to cover both singular and plural, unless otherwise indicated herein or clearly contradicted by context, and not as a definition of a term. Including, having, including, and containing are understood to be open-ended terms (meaning a phrase such as, including, but not limited to) unless otherwise noted. Connected, when unmodified and referring to physical connections, may be understood as partly or wholly contained within, attached to, or joined together, even if there is something intervening.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two but can be more when so indicated either explicitly or by context. Further, unless stated otherwise or otherwise clear from context, phrases such as based on means based at least in part on and not based solely on.

Operations of methods in FIGS. 3, 4A, 4B, and 5, and the sub-steps described herein can be performed in any suitable order unless otherwise indicated herein or otherwise clearly contradicted by context. In at least one embodiment, a method includes processes such as those processes described herein (or variations and/or combinations thereof) that may be performed under control of one or more computer systems configured with executable instructions and that may be implemented as code (e.g., executable instructions, one or more computer programs or one or more applications) executing collectively or exclusively on one or more processors, by hardware or combinations thereof.

In at least one embodiment, such code may be stored on a computer-readable storage medium. In at least one embodiment, such code may be a computer program having instructions executable by one or more processors. In at least one embodiment, a computer-readable storage medium is a non-transitory computer-readable storage medium that excludes transitory signals (such as a propagating transient electric or electromagnetic transmission) but includes non-transitory data storage circuitry (such as buffers, cache, and queues) within transceivers of transitory signals. In at least one embodiment, code (such as executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein.

In at least one embodiment, a set of non-transitory computer-readable storage media includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit (CPU) executes some of instructions while other processing units execute other instructions. In at least one embodiment, different components of a computer system have separate processors and different processors execute different subsets of instructions.

In at least one embodiment, computer systems are configured to implement one or more services that singly or collectively perform operations of processes described herein and such computer systems are configured with applicable hardware and/or software that enable performance of operations. In at least one embodiment, a computer system that implements at least one embodiment of present disclosure is a single device or is a distributed computer system having multiple devices that operate differently such that distributed computer system performs operations described herein and such that a single device does not perform all operations.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

What is claimed is:

1. A system to determine flaws in cement and casing associated with a formation, the system comprising:
   a tool having a single scintillating crystal to receive gamma rays returned from a formation and a wellbore;
   a rotating shield comprising at least two windows that are of different sizes and that are diametrically opposite to each other, wherein the gamma rays are received through the two windows simultaneously; and
   at least one processor and memory comprising instructions that when executed by the at least one processor causes the at least one processor to:
   determine first gamma counts associated with the gamma rays received in the two windows at a first degree of alignment of the two windows with respect to an azimuth associated with the formation;
   determine second gamma counts associated with the gamma rays received in the two windows at a second degree of alignment of the two windows with respect to the azimuth, the second degree of alignment being offset from the first degree of alignment; and
   generate a visual representation of the gamma rays to indicate the flaws in the cement and casing, wherein a background of the visual representation comprises at least part of a contrast that is suppressed based in part on a gamma contrast range obtained from at least the first gamma counts and the second gamma counts.

2. The system of claim 1, wherein the contrast that is suppressed comprises, at least in part, flattened sinusoidal aspects of the contrast in the background of the visual representation.

3. The system of claim 1, wherein the gamma contrast range comprises a gamma count that is in the range from about 300 to about 10,000; about 600 to about 5000; about 900 to about 3000; or about 1200 to about 2000.

4. The system of claim 1, wherein the at least one processor and the memory comprising instructions that when executed by the at least one processor further causes the at least one processor to:
   provide differences in the contrast of the visual representation of the gamma rays, wherein at least one of the differences in the contrast indicate the flaws in the cement and casing, and wherein the at least part of that contrast that is suppressed is subject to an adjustment to the at least one of the differences in the contrast.

5. The system of claim 1, wherein the first gamma counts and the second gamma ray counts are associated with different observations conducted at different times using the tool.

6. The system of claim 1, wherein the tool is subject to a calibration performed using modeled flaws in a modeled cement and casing prior to being used downhole with the formation, the calibration to obtain an estimated adjustment to at least one aspect of the visual representation generated for the formation.

7. The system of claim 1, wherein the tool is to receive the first gamma counts and the second gamma ray counts as a first set at a first time period and as a second set in a second time period to enable redundant or overlapping observations to be used cumulatively in the visual representation.

8. A system comprising:
   one or more processing units to generate a visual representation of gamma rays received simultaneously in at least two windows of a rotating shield of a tool that comprises a single scintillating crystal, the gamma rays returned from a formation and a wellbore, the at least two windows of different sizes and diametrically opposite to each other, the visual representation to indicate flaws in cement and casing associated with a formation, wherein a background of the visual representation comprises at least part of a contrast that is suppressed based in part on a gamma contrast range obtained from at least first gamma counts and second gamma counts of the gamma rays, the first gamma counts associated with the gamma rays received in the two windows at a first degree of alignment of the two windows with respect to an azimuth associated with the formation and the second gamma counts associated with the gamma rays received in the two windows at a second degree of alignment of the two windows with respect to the azimuth, the second degree of alignment being offset from the first degree of alignment.

9. The system of claim 8, wherein the contrast that is suppressed comprises, at least in part, flattened sinusoidal aspects of the contrast in the background of the visual representation.

10. The system of claim 8, wherein the gamma contrast range comprises a gamma count that is in the range from about 300 to about 10,000; about 600 to about 5000; about 900 to about 3000; or about 1200 to about 2000.

11. The system of claim 8, wherein the one or more processing units are further to:
    provide differences in the contrast of the visual representation of the gamma rays, wherein at least one of the differences in the contrast indicate the flaws in the cement and casing and wherein the at least part of that contrast that is suppressed is subject to an adjustment to the at least one of the differences in the contrast.

12. The system of claim 8, wherein the first gamma counts and the second gamma ray counts are associated with different observations conducted at different times using the tool.

13. The system of claim 8, wherein the tool is subject to a calibration performed using modeled flaws in a modeled cement and casing prior to being used downhole with the formation, the calibration to obtain an estimated adjustment to at least one aspect of the visual representation generated for the formation.

14. The system of claim 8, wherein the tool is to receive the first gamma counts and the second gamma ray counts as a first set at a first time period and as a second set in a second time period to enable redundant or overlapping observations to be used cumulatively in the visual representation.

15. A method for a system and a tool to determine flaws in cement and casing associated with a formation, the method comprising:

enabling a single scintillating crystal of the tool to receive gamma rays returned from a formation and a wellbore, the tool associated with a rotating shield comprising at least two windows that are of different sizes and that are diametrically opposite to each other, wherein the gamma rays are received through the two windows simultaneously;

determining, using at least one processor, first gamma counts associated with the gamma rays received in the two windows at a first degree of alignment of the two windows with respect to an azimuth associated with the formation;

determining second gamma counts associated with the gamma rays received in the two windows at a second degree of alignment of the two windows with respect to the azimuth, the second degree of alignment being offset from the first degree of alignment; and providing a visual representation of the gamma rays to indicate the flaws in the cement and casing, wherein a background of the visual representation comprises at least part of a contrast that is suppressed based in part on a gamma contrast range obtained from at least the first gamma counts and the second gamma counts.

16. The method of claim 15, wherein the contrast that is suppressed comprises, at least in part, flattened sinusoidal aspects of the contrast in the background of the visual representation.

17. The method of claim 15, wherein the gamma contrast range comprises a gamma count that is in the range from about 300 to about 10,000; about 600 to about 5000; about 900 to about 3000; or about 1200 to about 2000.

18. The method of claim 15, wherein the at least one processor and the memory comprising instructions that when executed by the at least one processor further causes the at least one processor to:

provide differences in the contrast of the visual representation of the gamma rays, wherein at least one of the differences in the contrast indicate the flaws in the cement and casing and wherein the at least part of that contrast that is suppressed is subject to an adjustment to the at least one of the differences in the contrast.

19. The method of claim 15, wherein the first gamma counts and the second gamma ray counts are associated with different observations conducted at different times using the tool.

20. The method of claim 15, wherein the tool is subject to a calibration performed using modeled flaws in a modeled cement and casing prior to being used downhole with the formation, the calibration to obtain an estimated adjustment to at least one aspect of the visual representation generated for the formation.

* * * * *